June 4, 1963  E. R. JOHNSON  3,092,074
AUTOMATIC RELEASE MECHANISM FOR A MILKING APPARATUS
Filed June 17, 1960  2 Sheets-Sheet 1

INVENTOR.
ERWIN R. JOHNSON
BY
ANDRUS & STARKE
Attorneys

June 4, 1963  E. R. JOHNSON  3,092,074
AUTOMATIC RELEASE MECHANISM FOR A MILKING APPARATUS
Filed June 17, 1960  2 Sheets-Sheet 2
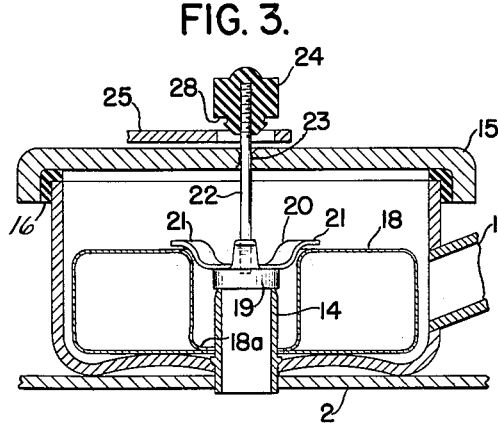
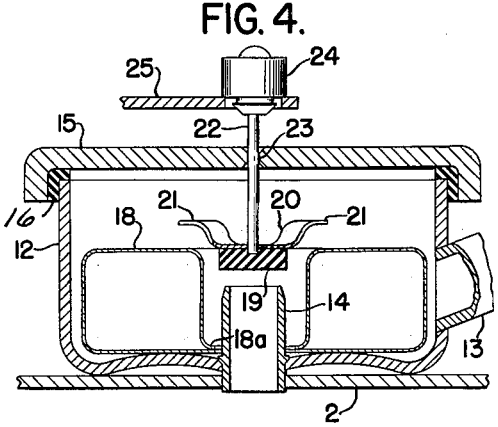
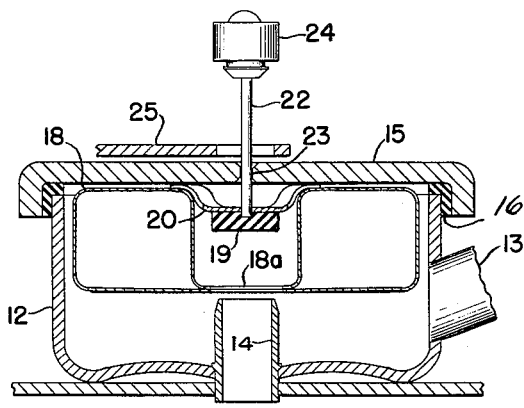
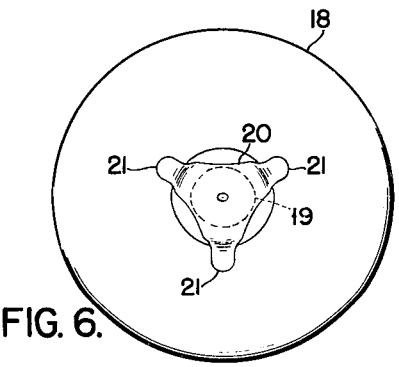
*INVENTOR.*
ERWIN R. JOHNSON
*BY*
ANDRUS & STARKE
Attorneys United States Patent Office 3,092,074
Patented June 4, 1963

1

3,092,074
AUTOMATIC RELEASE MECHANISM FOR A MILKING APPARATUS
Erwin R. Johnson, Beloit, Wis., assignor, by mesne assignments, to Sta-Rite Products, Inc., Delavan, Wis., a corporation of Wisconsin
Filed June 17, 1960, Ser. No. 36,971
7 Claims. (Cl. 119—14.08)

This invention relates to a milking apparatus and more particularly to an automatic release device for breaking the vacuum applied to an animal's teats after flow of milk ceases.

An automatic release device for a milker is employed to break the vacuum applied to a cow's teats after the flow of milk has ceased in order to prevent injury to the cow. In the conventional automatic shutoff device, four cups or receptacles are employed, each of which has a milk inlet nipple which is connected to a teat cup. Each of the cups is provided with a milk outlet spaced above the bottom of the cup and which communicates with a bucket or pan and each outlet is adapted to be closed off by a valve member carried by a float. Vacuum is applied through the bucket to each of the teat cups and in order to initially establish the vacuum to the teat cups and start the flow of milk, a lifting mechanism is employed to lift the valve members from the outlet tubes. Once the milk is flowing into the cups, the floats will rise and engage the valves to thereby maintain the valves in the open position. When the flow of milk ceases, the floats will lower thereby causing the valve members to close off the outlet tubes and break the vacuum to the teat cups.

The conventional automatic shutoff device includes an operating mechanism for lifting the valve members which is normally located within the bucket in the milk zone. These devices are composed of a substantial number of moving parts and require cleaning after each milking operation. Because of the location and the number of components involved, it is often difficult to maintain the operating mechanism in the required degree of cleanliness.

The present invention is directed to a milking apparatus including an automatic shutoff device in which the valve members are initially open to establish the vacuum to the teat cups by a mechanism located externally of the cups and bucket. More specifically, the valve members are each carried by a vertical lift pin which extends upwardly through an opening in the cover of the cup. The upper end of each pin is operable connected to an arm, and the arms are connected to a common plate disposed generally parallel to the upper surface of the lid for the bucket. The plate is connected to an operating handle having a bent end portion which bears against the surface of the lid. By pivoting the handle about the bent end, the plate is moved vertically to thereby correspondingly lift the valve members in each of the cups to establish vacuum to the teat cups and thereby start the flow of milk.

The present invention provides a device in which the operating mechanism for initially lifting the valve members from the outlet tubes is located outside of the milk zone. This substantially simplifies the cleaning of the apparatus and insures a more sanitary milking operation.

As the operating handle and lifting plate are moved in a vertical direction to thereby correspondingly move the valve members in a vertical direction, a more positive and uniform lifting action is provided than in conventional devices where the operating handle is moved in a plane parallel to the lid of the device.

The automatic lid of the invention is particularly adaptable for use with a shallow bucket or pail which is employed in a pipe line milking system. With this application, the cups or receptacles are located solely on the upper surface of the lid and a very shallow bucket or pan can be employed.

Other objects and advantages will appear in the course of the following description.

The drawings illustrate the best mode presently contemplated of carrying out the invention.

In the drawings:

FIG. 3 is an enlarged vertical section taken on a vertical median plane through a cup and showing the float and valve in the closed position before the milk flows into the cup;

FIG. 4 is a view similar to FIG. 3 showing the position of the valve member after being lifted by the operating member;

FIG. 5 is a view similar to FIG. 3 and showing the cup being substantially filled with milk during normal milking operation; and FIG. 6 is a top plan view of the float and valve structure.

Figure 1:
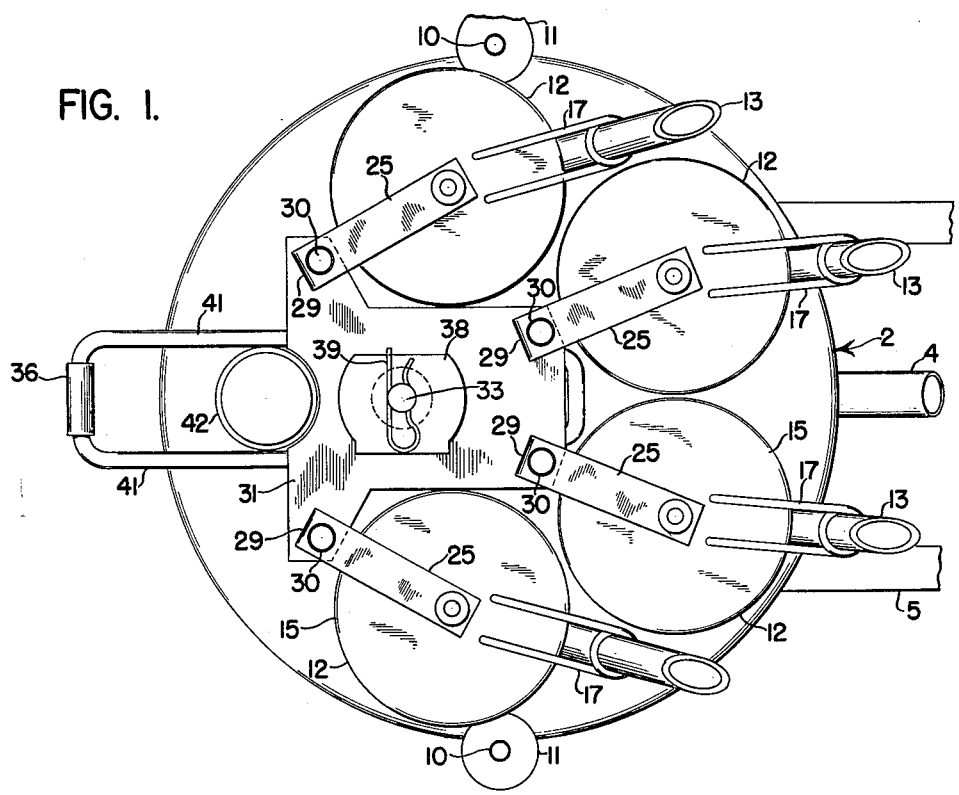
FIGURE 1 is a top plan view of the milking apparatus of the present invention.

The drawings illustrate an automatic shutoff device for a milking system which serves to automatically break the vacuum to the teat cups after the flow of milk has ceased in order to prevent injury to the cow's teats.

The structure comprises a pan or shallow bowl 1 having an open top which is enclosed by a lid 2. The pan 1, as shown, is adapted to be used in a pipe line milking system in which the milk collected in the pan is continuously discharged to a bulk storage location. However, a conventional larger self-containing bucket may be employed in which the milk from the cow is collected in the bucket itself.

The pan 1 is provided with an enlarged or thickened bottom portion 3 having a milk channel 3a which serves as a weight and tends to pull the apparatus downwardly and apply pressure to the cow's teats. Milk is discharged from the pan channel 3a through an outlet nipple 4 which is connected to a suitable source of vacuum.

A handle 5 is connected to the lower portion of the pan 1 by bolts 6 and the upper portion of the handle, not shown, extends upwardly and is bent over the top of the lid 2 in a position where it can be suspended from a surcingle disposed around the cow. The lower end 7 of the handle is bent to provide a stand for the apparatus when it is set on the ground or other support.

The lid 2 is provided with a downwardly extending peripheral flange 2a and a gasket 8 of resilient material is disposed between the lid and the outwardly extending flange of the pan to seal the joint therebetween. The lid 2 is connected to the pan 1 or bowl by means of a plurality of generally L-shaped clamping rods 9 which extend outwardly and upwardly from the pan 1. The upper vertical ends 10 of the rods 9 are threaded and receive nuts 11 which serve to clamp the lid to the peripheral edge of the pan 1.

Four generally cylindrical cups 12 or receptacles are secured to the upper surface of the lid 2 and each cup is provided with an inlet nipple 13 which is connected to a hose leading to a teat cup. The cups 12 have a greater diameter than height and each cup is provided with a central vertical outlet tube 14 which extends through aligned openings in the bottom surface of the cup 12 and lid 2. The tube 14 provides communication between the cup 12 and the pan 1, and milk overflows from the cup through the outlet tube 14 to the pan.

The open top of each cup 12 is enclosed by a cover 15 and the cover is sealed to the wall of the cup by an annular seal 16. The covers 15 are generally made of transparent plastic material. Clips 17 secured to the nipples 13 engage the upper surface of the covers 15 and serve to maintain the covers in engagement with the cups 12.

An annular float 18 is slidably disposed around the central outlet tube 14. The lower portion of the inner surface of the float is provided with an inwardly extending ledge or flange 18a. The clearance or space between flange 18a and the outer surface of tube 14 forms an annular passageway of restricted size.

The outlet tube 14 is adapted to be closed off by a resilient valve 19 which is formed integrally with a support plate 20. The support plate 20 is provided with a plurality of outwardly extending legs 21 and, as best shown in FIGS. 3–6, the legs are bent upwardly and then outwardly in a generally horizontal plane so that the outer portions of the legs 21 are adapted to engage and rest on the upper surface of the respective float 18.

The valve 19 of each cup 12 is carried by a vertical lift pin 22 which extends upwardly through an opening 23 in the cover 15 of the cup. The upper end of the lift pin 22 is threadedly secured to a nut 24.

In order to lift the valves 19 from the respective outlet tubes 14 at the beginning of the milking operation to thereby establish a vacuum through the cups 12 to the teat cups, each of the nuts 24 is operably connected to an arm 25. In this regard, the nut 24 is provided with a shoulder 28 which rests on the upper surface of arm 25. With this construction, upward movement of the arm will cause the arm to engage the shoulder 28 to thereby raise the nut 24 and correspondingly raise the valve 19 from the outlet tube 14. However, the arm 25 can be lowered relative to the button during the milking operation without lowering the valve 19.

The inner end of each arm 25 is provided with a reverse bend 29 and is secured to an upstanding pin 30 secured to an actuating plate 31. Plate 31 is adapted to be moved vertically to thereby move the arms vertically and cause a corresponding upward movement of the valves 19.

To mount the plate 31 for vertical movement, a tubular member 32 is secured within a central opening in plate 31 and is slidably disposed on a post 33 extending vertically from the lid 2. The tubular member 32 is provided with a reduced lower end portion 34 which is disposed within an opening in a plate 35 secured to the operating handle 36. The enlarged upper portion of the tubular member 32 rests on the upper surface of the plate 35.

A spring 37 is disposed around the upper end of the tubular member 32 and bears against the lower surface of a keeper plate 38 which is secured to the post 33 by a cotter pin 39.

Figure 2:
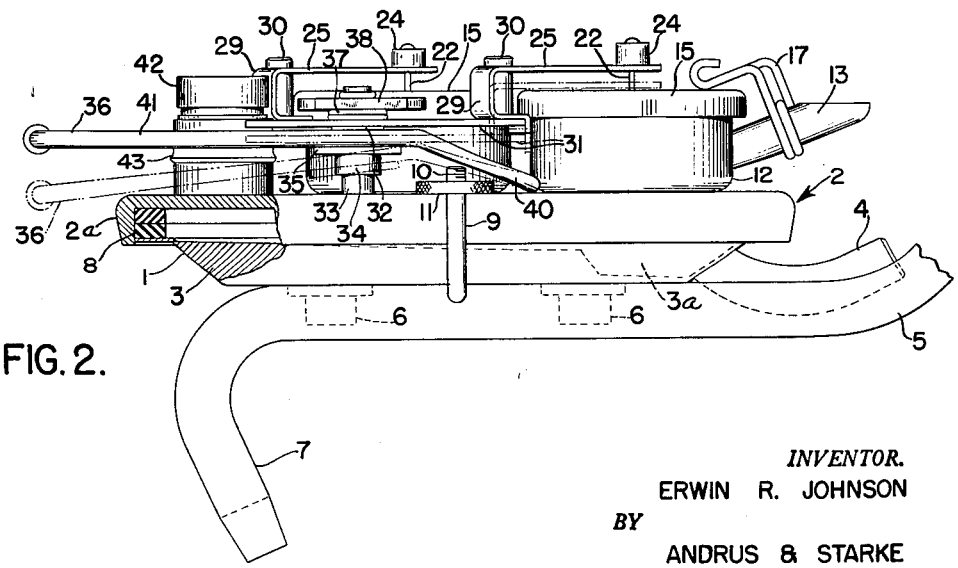
FIG. 2 is a side elevation with one cup omitted and parts broken away in section of the apparatus of FIG. 1.

As best shown in FIG. 2, the inner end of the operating handle is provided with a bent portion 40 and the inner or lower end of the bent portion engages the upper surface of the lid 2 and serves as a pivot point for pivotal movement of the handle. The arms 41 or opposite sides of the handle straddle a pulsator post 42 which is secured to the lid 2 and the post 42 is provided with a detent groove 43 which receives the arms 41 and positions the handle in the upper position. The phantom lines in FIG. 2 illustrate the lower position of the operating mechanism. In this position, the arms 41 of the handle straddle the lower portion of the post 42 below the detent groove 43.

A pulsator of the conventional type used in automatic milking operations, and not shown, is secured to the pulsator post 42.

In operation of the apparatus, the teat cups are initially applied to the cow's teats and a suitable vacuum line is connected to the outlet tube 4 of the pan 1. At this time, the valves 19 are seated on the top of the outlet tubes 14 and the operating handle 36 is in the lower position, as shown by the phantom lines in FIG. 2.

To establish vacuum through the pan 1 to the teat cups, the operating handle 36 is pivoted upwardly and engaged with the detent groove 43, thereby moving the plate 31 and arms 25 upwardly. Raising the arms 25 upwardly lifts the nuts 24 and correspondingly raises the valves 19 from the respective outlet tubes 14. Opening of the valves establishes a vacuum to the teat cups through the nipples 13. After the milk has begun to flow into the cups, the floats 18 will rise, as shown in FIG. 5, and engage the legs 21 of the valve support plates 20 thereby raising the valves 19 further upwardly within the cups 12.

At this time, the operator will return the operating handle 36 to the lower position and the float, being in the upper position, will hold the valves open. After the milking operation has been completed and the milk ceases to flow, the milk in the cup will drain through the outlet tube 14 and the float 18 will be lowered until the valve 19 seats on the outlet tube. As the float lowers, the milk is forced to flow through the restricted passage between flange 18a and tube 14 and then through the upper end of outlet tube 14 to the pan or bowl 1. By proper design of the weight of the float and the use of the flange 18a, the milk trapped in the cup flows over the upper end of the outlet tube for a controlled length of time which is the stripping time. As the float moves downwardly within the cup, the air movement out of the cup is less than the air movement into the cup through opening 23 around the pin 22. The pressure in the cup approaches that of atmospheric and this causes a rapid and positive seating of the valve 19 on the outlet tube 14. When the valve 19 seats on the outlet tube 14, the pressure in the cup will become atmospheric. This allows the teat cup to fall off the cow's teat for this particular cup. Each of the four cups will release the teat cups as that quarter of the cow is milked out.

The present invention provides a device for automatically releasing the teat cups from the cow's teats at the completion of the milking operation. The apparatus includes a novel and improved lifting mechanism for initially lifting the valve from the outlet tubes to establish a vacuum to the cow's teats. The operating mechanism is located on the upper side of the lid in a position where it is out of the milk zone and this substantially simplifies the cleaning operation.

As the cups 12 are located solely on the upper surface of the lid, a shallow bowl or pan can be employed and this provides a more compact unit which is easier to handle and clean.

Various modes of carrying out the invention are contemplated as being within the scope of the following claims particularly pointing out and distinctly claiming the subject matter which is regarded as the invention.

I claim:
1. In an automatic release device for a milking apparatus, a cup having an open top and having an inlet opening connected to an animal's teat, a vertical outlet tube having the upper end spaced above the bottom of the cup and having the other end providing communication with the exterior of the cup, a cover to enclose the open end of the cup, an annular float disposed within the cup and having a central opening to receive said outlet tube, a valve member disposed within the cup and engageable with the outlet opening to open and close the same, said valve member having a substantially smaller cross sectional area than the central opening in said float whereby in the closed position the valve will be disposed within the central opening in the float, support means on the valve in selective contact with the float for holding the valve in the open position when the float is in the upper portion of the cup, a lifting member connected to the valve and extending substantially vertically through an opening in said cover, and means connected to the upper end of the lifting member and disposed solely on the exterior of the cup for raising the lifting member and thereby opening the valve to initially establish a vacuum through the cup to the animal's teat and start the flow of milk.

2. The structure of claim 1, in which the lower edge portion of the float bordering the central opening has a smaller diameter than the upper edge portion of the float bordering the central opening to thereby provide a restricted clearance between the outlet tube and said lower edge portion to thereby regulate the draining of milk from the cup at the completion of the milking operation.

3. In an automatic release device for a milking apparatus, a container connected to a source of vacuum, a lid for the container, a cup secured to the lid and disposed externally thereof with the diameter of the cup being substantially greater than the height thereof, said cup having an open top and having an inlet opening connected to an animal's teat, an outlet tube providing communication between the cup and the container, a cover to enclose the open upper end of the cup, valve means disposed within the cup to open and close the outlet tube and movable in response to milk in said cup whereby said valve means will open the outlet opening in the presence of a given quantity of milk in said cup and will close the outlet opening in the absence of said quantity of milk, a float disposed in the cup, support means on the valve means in selective contact with the float for maintaining the valve means in the open position when the float is in the upper portion of the cup, a lifting member connected to said valve means and extending upwardly through an opening in said cover, a plate operably connected to the upper end of the lifting member and disposed solely on the exterior of the cup, and a handle having a generally horizontal portion secured to the plate and having a downwardly bent portion with the lower end of the downwardly bent portion bearing against the lid of the container, said handle being disposed to be pivoted around said lower end to thereby raise the plate and correspondingly lift the lifting member to open the valve means and establish a vacuum through the cup to start the flow of milk.

4. The structure of claim 3, and including means for locking the handle in the upper position.

5. In an automatic release device for a milking apparatus, a container connected to a source of vacuum, a lid for the container, a cup secured to the lid and disposed externally thereof with the diameter of the cup being substantially greater than the height thereof, said cup having an open top and having an inlet opening connected to an animal's teat, an outlet tube providing communication between the cup and the container, a cover to enclose the open upper end of the cup, valve means disposed within the cup to open and close the outlet tube and movable in response to milk in said cup whereby said valve means will open the outlet opening in the presence of a given quantity of milk in said cup and will close the outlet opening in the absence of said quantity of milk, a float disposed in the cup, support means on said valve means in selective contact with the float for maintaining said valve means in the open position when the float is in the upper portion of the cup, a lifting member connected to said valve means and extending upwardly through an opening in said cover, an operating member connected to the upper end of the lifting member and disposed solely on the exterior of the cup, a handle having a horizontal portion secured to the operating member and having a downwardly bent portion with the lower end of said downwardly bent portion bearing against the upper surface of the lid of the container, and a post extending upwardly from said lid and having a groove therein, said handle having an opening therein to receive the post with the portions of the handle bordering the opening disposed to engage the groove to thereby lock the handle in the upper position.

6. In an automatic shutoff apparatus for a milking system, a cup having an open top and having an inlet opening connected to an animal's teat and having an outlet opening spaced above the bottom of the cup and connected to a source of vacuum, a cover to enclose the open end of the cup, a valve member disposed within the cup to open and close the outlet opening and movable in response to milk in said cup whereby said valve member will open the outlet opening in the presence of a given quantity of milk in said cup and will close the outlet opening in the absence of said given quantity of milk, a float disposed in the cup, support means on the valve member in selective engagement with the float for opening the valve member when the float is in the upper portion of the cup, a lifting pin engageable with the valve member and having a stem extending through an opening in said cover, said pin having an enlarged head connected to the stem and located on the exterior of the cover, and an operating mechanism located on the exterior of the cup and having an opening to slidably receive said stem with the cross sectional dimension of said opening being less than the cross sectional dimension of the head so that upward movement of the operating member will engage the head and lift the pin to thereby open the valve member and establish a vacuum through the cup to the animal's teat to start the flow of milk.

7. In an automatic release device for a milking apparatus, a cup having an open top and having an inlet opening connected to an animal's teat and having a central tube extending upwardly from the bottom of the cup and said tube including an outlet opening spaced above the bottom of the cup and connected to the source of vacuum, a cover to enclose the open end of the cup, an annular float member disposed around the tube and movable in response to milk in said cup, a valve member disposed within the cup and engageable with the opening to open and close the same, said valve member being freely movable with respect to said float member, support means on one of said members in selective contact with the other of said members for holding the valve member open when the float member is in the upper portion of said cup, a lifting pin engageable with the valve member and extending upwardly through an opening in said cover, and an operating mechanism connected to the outer end of the lifting pin and disposed on the exterior of the cup, said mechanism being movable to move the valve member upwardly to thereby initially open the valve and establish a vacuum to the cup to the animal's teat to start the flow of milk.

References Cited in the file of this patent

UNITED STATES PATENTS

| | | |
|---|---|---|
| 854,643 | Hartnett et al. | May 21, 1907 |
| 1,276,803 | Paarman | Aug. 27, 1918 |
| 2,766,722 | Schultheis | Oct. 16, 1956 |
| 2,887,986 | Golemon | May 26, 1959 |